United States Patent Office 3,454,698
Patented July 8, 1969

3,454,698
TREATMENT OF DEPRESSION WITH
DESMETHYLIMIPRAMINE
John H. Biel, Milwaukee, and Claude I. Judd, Mequon,
Wis., assignors to Colgate-Palmovile Company, a corporation of Delaware
No Drawing. Continuation-in-part of application Ser. No. 62,564, Oct. 14, 1960, which is a continuation-in-part of application Ser. No. 31,524, May 25, 1960. This application Aug. 3, 1961, Ser. No. 128,978
Int. Cl. A61k 27/00; C07d 41/00
U.S. Cl. 424—244                                    6 Claims

ABSTRACT OF THE DISCLOSURE

Pharmaceutical compositions containing as an active ingredient a compound selected from desmethylimipramine and its nontoxic addition salts as useful in a method of treating depression. Desmethylimipramine is also known as N-(3-methylaminopropyl)iminodibenzyl, 5-($\gamma$-methylaminopropyl)iminodibenzyl, desipramine and DMI.

RELATED CASES

The present application is a continuation-in-part of our earlier application Ser. No. 62,564, filed Oct. 14, 1960, which is in turn a continuation-in-part of our still earlier application Ser. No. 31,524, filed May 25, 1960, now abandoned.

This invention relates to derivatives of iminodibenzyl. More particularly, this invention is concerned with novel N-(aminoalkyl)iminodibenzyl and N-(substituted-aminoalkyl)iminodibenzyl compounds, processes of producing the same, intermediates useful in such processes, and novel pharmaceutical uses for such compounds.

According to the present invention there are provided novel N-(aminoalkyl)iminodibenzyl and N-(substituted-aminoalkyl)iminodibenzyl compounds of the formula

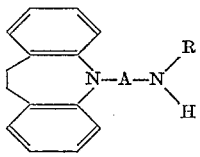

wherein A is a lower alkylene of 2 to 5 carbons with at least 2 carbons between the connecting nitrogens, and R is hydrogen, a lower alkyl of 1 to 5 carbons such as methyl, ethyl, propyl and isopropyl, and arylmethyl groups such as benzyl and naphthylmethyl, novel intermediates useful in producing such compounds, as well as nontoxic acid addition salts thereof.

The compounds of this invention can be produced by reacting an alkali metal salt of iminodibenzyl with a reactive N-benzyl-N-lower alkyl aminoalkyl halide or N,N-dibenzylaminoalkyl halide to form an intermediate N-(N-benzyl-N-lower alkyl aminoalkyliminodibenzyl or N-(N, N-dibenzylaminoalkyl)-iminodibenzyl which is then subjected to hydrogenolytic cleavage of the N-benzyl group or one or both of the N,N-dibenzyl groups to form the corresponding N-(N-substituted-aminoalkyliminodibenzyl or N-(aminoalkyl)iminodibenzyl.

The process to produce the N-(N-lower alkyl amino-alky)iminodibenzyl compounds can be represented as follows:

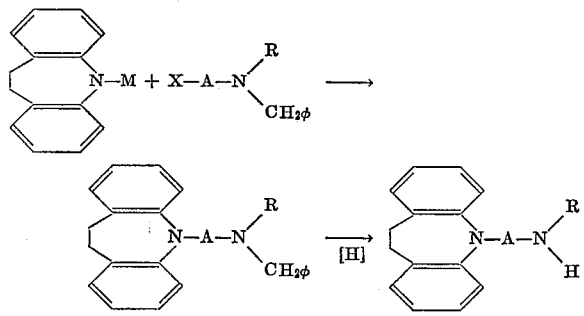

wherein M is a reactive alkali metal and particularly is sodium, potassium or lithium, X is p-toluene sulfonate or a reactive halogen and particularly is chorine, bromine or iodine, A is a lower alkylene of 2 to 5 carbons, advisably in a straight chain, R is a lower alkyl of 1 to 5 carbons, and $\varphi$ is phenyl. Instead of $\varphi$ being phenyl, other aryl hydrocarbon groups can be present in place thereof such as diphenyl or naphthyl, but these are not ordinarily used because phenyl functions wholly satisfactorily and the N-benzyl reactants are more readily available.

The process of producing the N-(aminoalkyl)iminodibenzyl compounds and novel intermediates can be represented as follows:

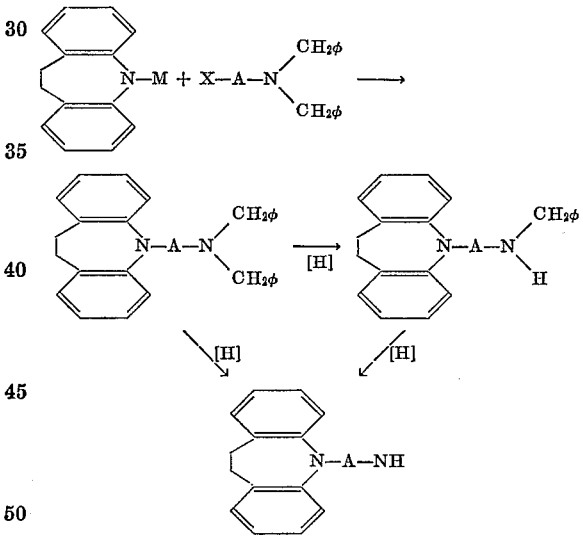

wherein M, X, A and $\varphi$ have the significance previously assigned.

The alkali metal iminodibenzyl salt used as a reactant can be prepared by reacting iminodibenzyl with an alkali metal hydride or amide such as sodium hydride, lithium amide, sodium amide potassium amide or lithium hydride. The reaction is readily effected by bring the reactants together in an inert anhydrous high boiling liquid reaction medium such as benzene, xylene, toluene, tetralin or cumene. Elevated temperatures such as about 75 to 150° C. are generally suitable for the reaction. In general, however, the reflux temperature is utilized since it permits ready temperature control. The alkali metal salt of miniodibenzyl forms rapidly and the reaction is generally completed in about 1 to 3 hours. Following termination of the reaction the product can be isolated if desired, but this is ordinarily not done since it can be used as present in the reaction mixture.

Reaction between the alkali metal iminodibenzyl salt and the N-benzyl-N-lower alkyl aminoalkyl halide or N,N-dibenzylaminoalkyl halide can be effected by bringing the reactants together in a suitable inert high boiling liquid reaction medium such as toluene, xylene, tetralin, dimethyl formamide, dioxane aranisole, or cumene. The reaction mixture from the formation of the alkali metal iminodibenzyl salt can be used as the reactant and solvent source to which the N-benzyl-N-lower alkyl aminoalkyl halide or N,N-dibenzylaminoalkyl halide can be added. Elevated temperatures of about 75 to 150° C., and particularly the reflux temperature, can be employed to effect reaction. About 3 to 20 hours is generally adequate to substantially complete the reaction. After the reaction is terminated the product can be recovered by filtering the reaction mixture, distilling off the solvent and fractionally distilling the high boiling base in vacuo.

Among the N-benzyl-N-lower aminoalkyl halides which can be used in the process are N-benzyl-N-methylaminopropyl chloride, N-benzyl-N-ethylaminoethyl bromide, 2-(N-benzyl-N-propylamino)propyl chloride and 2-(N-benzyl-N-methylamino)propyl chloride.

Some N,N-dibenzylaminoalkyl halides that can be used in the process are N,N-dibenzylaminoethyl chloride, N,N-dibenzylaminopropyl chloride, N,N-dibenzylaminobutyl bromide and 2-(N,N-dibenzylamino)propylchloride.

Representative of the compounds produced by the described reaction are

N-(3-N-benzyl-N-methylaminopropyl)iminodibenzyl,
N-(2-N-benzyl-N-ethylaminoethyl)iminodibenzyl,
N-(2-N-benzyl-N-methylaminopropyl)iminodibenzyl,
N-(4-[N-benzyl-N-ethylamino]butyl)iminodibenzyl,
N-(3-[N-benzyl-N-butylamino]propyl)iminodibenzyl,
N-(3-[N,N-dibenzylamino]propyl)iminodibenzyl,
N-(2-[N,N-dibenzylamino]ethyl)iminodibenzyl,
N-(4-[N,N-dibenzylamino]butyl) iminodibenzyl, and
N-(2-[N,N-dibenzylamino]propyl)iminodibenzyl.

The N-(N-benzyl-N-lower alkyl aminoalkyl)-iminodibenzyl and N - (N,N - dibenzylaminoalkyl)iminodibenzyl compounds are converted to the corresponding compounds lacking the N-benzyl or one or both of the benzyls of the N,N-dibenzyl (or other hydrocarbon arylmethyl group) by hydrogenolytic cleavage of the benzyl group(s). This can be accomplished by catalytic hydrogenation by adding the N-(N-benzyl-N-lower alkyl aminoalkyl)iminodibenzyl or N - (N,N-dibenzylaminoalkyl)iminodibenzyl, preferably as an acid addition salt such as the hydrochloride, to a suitable solvent such as water or a lower alcohol. Platinum, platinum oxide and palladium are catalysts which are useful in effecting the hydrogenation. Hydrogen pressures of about 30 to 3,000 p.s.i., and from room temperature to moderately elevated temperatures (100° C.) are suitable for effecting the reaction. The hydrogenation proceeds quickly and its progress can be measured by the hydrogen uptake. When the hydrogen uptake ceases the reaction may be considered completed. After filtering the reaction mixture, it may be evaporated to dryness and the product triturated with a solvent such as ether and separated by filtration.

Selective cleavage of one of the two N,N-dibenzyl groups can be readily effected by terminating the hydrogenation after one of the benzyl groups has been removed. This can be determined by measuring the hydrogen uptake and stopping the hydrogenation after the amount of hydrogen needed for removal of one benzyl has been used up.

Representative of the N - (alkylaminoalkyl)iminodibenzyl, N - (benzylaminoalkyl)iminodibenzyl and N-(aminoalkyl)iminodibenzyl compounds which are produced in this way are:

N-(3-methylaminopropyl)iminodibenzyl,
N-(2-ethylaminoethyl)iminodibenzyl,
N-(2-methylaminopropyl)iminodibenzyl,
N-(4-ethylaminobutyl)iminodibenzyl,
N-[3-N-(butylamino)propyl]iminodibenzyl,
N-(3-benzylaminopropyl)-iminodibenzyl,
N-(2-benzylaminoethyl)iminodibenzyl,
N-(3-aminopropyl)iminodibenzyl,
N-(2-aminoethyl)iminodibenzyl,
N-(2-aminopropyl)iminodibenzyl,
N-2-(3-aminopropyl)iminodibenzyl, and
N-(4-aminobutyl)iminodibenzyl.

The compounds of this invention form water soluble acid addition salts with organic and inorganic acids such as hydrochloric acid, hydrobromic acid, sulphuric acid, phosphoric acid, methane sulphonic acid, ethane disulphonic acid, acetic acid, citric acid, maleic acid, succinic acid, tartaric acid, benzoic acid and phthalic acid.

The N-(alkylaminoalkyl)iminodibenzyl and N-(aminoalkyl)iminodibenzyl compounds of this invention as nontoxic acid addition salts are potent analgetics and, in addition, are potent hypothermic agents and anticholinergics. They are virtually inactive as antihistaminic agents. These compounds also sensitize the animal to norepinephrine and thus facilitate sympathetic nerve stimulation. This pharmacologic property endows these drugs with potential antidepresent effects in humans suffering from mental depression.

The most active compounds of this invention appear to be those in which A is n-propyl and particularly N-(3-methylaminopropyl)iminodibenzyl. This compound is about three times as potent an analgetic as N-(3-dimethylaminopropyl)iminodibenzyl. (See U.S. Patent No. 2,554,736 and Canadian Psychiatric Assoc. Journal, vol. 4, page S70 (1959).) Furthermore, the compound of this invention is a potent hypothermic agent whereas this prior art compound is ineffective for this purpose. In addition, this new compound is inactive as an antihistaminic agent whereas N-(3-dimethylaminopropyl)iminodibenzyl exhibits definite antihistaminic properties.

N-(3-methylaminopropyl)iminodibenzyl HCl gives an immediate antidepressant action in humans while N-(3-dimethylaminopropyl)iminodibenzyl HCl exerts a delayed antidepressant action, often starting weeks or months after initial administration. N-(3-methylaminopropyl) iminodibenzyl HCl often exerts an antidepressive effect in humans in one to two days. The presently recommended course of treatment is one to four weeks, with two to four weeks being more usual. Some cases require longer periods of treatment. No relapse has been observed in the cases treated after the drug has been withdrawn and the treatment terminated. The use of the prior art N-(3-dimethylaminopropyl)iminodibenzyl HCl requires a three to four month treatment. Termination of administration of this drug earlier is usually followed in a week by a relapse. In addition, even after completion of the treatment relapse occurs in many of the patients in a short time and often in a week or two.

The administration of N-(3-methylaminopropyl)iminodibenzyl HCl to humans is eminently more safe than the administration of N-(3-dimethylaminopropyl)iminodibenzyl HCl because while they have approximately the same safety factor as far as dosages are concerned, treatment with the former compound often can be achieved in one-fifth the time required for the latter. This also eliminates any chronic toxicity problem which might occur with the longer administration of the prior art compound.

Because of the faster action achieved with N-(3-methylaminopropyl)iminodibenzyl HCl, a far lesser amount of the drug need be purchased by the patient, resulting in a great saving. In addition, the shorter treatment necessary avoids the prolonged period of observation by the physician, thus greatly reducing the medical expense.

Many depressed patients have a suicidal tendency. This constitutes a serious risk to sucessful treatment so long as it persists. Because the prior art antidepressive compounds, including N-(3-dimethylaminopropyl)iminodibenzyl HCl, act very slowly in humans, it was necessary to use electric shock treatment immediately to eliminate this risk which would otherwise continue for months. Because of the rapid action obtained with N-(3-methylaminopropyl)iminodibenzyl HCl in depressed humans, the need for electric shock therapy in cases with suicidal tendencies is greatly reduced. Furthermore, N-(3-methylaminopropyl)iminodibenzyl HCl promotes relaxation and tranquilization along with amelioration of the depressed mood. It is an effective central stimulant with muscle relaxant properties. Immediate onset of action is demonstrable in both humans and animals. As compared to it, the central stimulating properties of N-(3-dimethylaminopropyl)iminodibenzyl HCl are not readily observable in animals. In addition, this compound increases body tension and promotes hyperirritability.

The compounds provided by this invention can be administered to animals as pure compounds or in the form of nontoxic acid addition salts. To obtain a practical size to dosage relationship one or more of the compounds is usually combined with a suitable pharmaceutical carrier and made into unit-dosage forms.

Pharmaceutical carriers which are liquid or solid can be used. The preferred liquid carrier is water. Flavoring materials can be included in the solutions as desired.

Solid pharmaceutical carriers such as starch, sugar and talc can be used to form powders. The powders can be used as such or be tableted, or be used to fill gelatin capsules. Suitable lubricants like magnesium stearate, binders such as gelatin and disintegrating agents like sodium carbonate in combination with citric acid can be used to form the tablets.

Unit dosage forms such as tablets and capsules can contain any suitable predetermined amount of one or more of the compounds and can be administered one or more at a time at regular intervals. Such forms should, however, contain a concentration of about 0.1 to 10% by weight of the compound of this invention.

A typical tablet can have the composition:

| | Mg. |
|---|---|
| 1. N-(3-methylaminopropyl)iminodibenzyl | 25 |
| 2. Starch, U.S.P. | 57 |
| 3. Lactose, U.S.P. | 73 |
| 4. Talc, U.S.P. | 9 |
| 5. Stearic acid | 6 |

Powders 1, 2 and 3 are slugged, then granulated, mixed with 4 and 5, and tableted.

Daily administration of about 5 to 500 mg. of N-(3-methylaminopropyl)iminodibenzyl HCl and other compounds of this invention is usually satisfactory. However, since some variation between compounds is to be expected, the precise dosages of each is to be evaluated prior to administration. Furthermore, the differences in patients normally will require prescription of various amounts of the active drugs from case to case. In general, the treatment of depressives can be achieved with the administration of unit dosage forms containing about 5 to 150 mg. of the active compounds given orally periodically during the day. The usual unit dosage is about 25 to 50 mg. given three times a day.

The following examples are presented to illustrate the preparation of representative compounds within the scope of the invention.

Example 1.—N-(3-N-benzyl-N-methylaminopropyl) iminodibenzyl

Iminodibenzyl (19.5 g., 0.1 mole) was converted to the anion by refluxing for 3 hours in 150 cc. of xylene with 4.0 g. of sodamide. Then the mixture was cooled to 50° C., 20.0 g. (0.1 mole+0.3 g. excess) of N-benzyl-N-methylaminopropyl chloride in a small amount of xylene was added and the mixture refluxed for 20 hours. After cooling, the inorganic salts were separated by filtration, washed with benzene and diluted with ether. The filtrate was washed with water, dried over potassium carbonate and the solvent removed by distillation. Fractionation of the resulting residue afforded 18.2 g. (51.2%) of the product, B.P. 195–201° C., at 40μ.

Analysis.—Calcd. for $C_{22}H_{28}N_2$: N, 7.86. Found: N, 7.79.

Example 2.—N-(3-methylaminopropyl)iminodibenzyl

A 19.0 g. (0.053 mole) sample of N-(3-benzyl-N-methyl-aminopropyl)iminodizenzyl in 50 cc. of ethanol was treated with one equivalent of 5% hydrochloric acid solution and hydrogenated over 1.2 g. of 10% palladium-on-charcoal at room temperature. When the theoretical amount of hydrogen had been consumed (11 hours) the reduction was stopped and the catalyst separated by filtration. The filtrate was diluted with water, extracted with ether and made basic with 10% sodium hydroxide. The free base was extracted with either, dried over potassium carbonate and the solvent removed by distillation leaving 14.9 g. (theory 13.15 g.) of crude product.

A 4.9 g. sample of the crude base was treated with etheral HCl yielding 4.4 g. of the hydrochloride salt, M.P. 212–215° C. Several recrystallizations from methanol-ether yielded 4.4 g. of the pure salt, M.P. 215–216° C.

Analysis—Calcd, for $C_{18}H_{23}N_2Cl$: N, 9.26; Cl⁻, 11.71. Found: N, 9.18; Cl⁻, 11.65.

Example 3.—N-(3-[N,N-dibenzylamino]propyl) iminodibenzyl

A 16.6 g. (0.085 mole) sample of iminodibenzyl was converted to the anion by refluxing 3 hours with 3.4 g. of sodium amide in 130 cc. of xylene. The reaction mixture was cooled to 40° C. and 23.3 g. (0.85 mole) of dibenzylaminopropyl chloride in 25 cc. of xylene was added and the mixture heated at reflux for 9 hours. The salts were separated by filtration and washed with benzene. The filtrate was washed with water until the water washes were neutral. Extraction with 5% hydrochloric acid afforded an oily insoluble hydrochloride salt which was separated from the benzene layer. The salt was combined with the aqueous layer and the mixture treated with potassium carbonate. The liberated base was extracted into benzene and dried over potassium carbonate. Removal of the solvent left 23.0 g. of the desired product as a dark oil.

Example 4.—N-(3-benzylaminopropyl)iminodibenzyl

The crude N-(3-dibenzylaminopropyl)iminodibenzyl (23 g.) from Example 3 was dissolved in 60 cc. of ethanol containing 8.4 cc. of concentrated hydrochloric acid, 1.5 g. of 10% palladium-on-charcoal was added and the mixture was treated with hydrogen at 41–45° C. and 60 p.s.i. After consuming 7 of a calculated 8.5 lbs. (for 2 moles) in 28 hours, the reduction was stopped, the catalyst separated by filtration and the solution was concentrated under reduced pressure. The residue was dissolved in water and the free base obtained by neutralizing with potassium carbonate. The mixture was extracted with ether and after drying over potassium carbonate, the solvent was removed, under reduced pressure. The residue was distilled yielding a single major fraction, 8.3 g., B.P. 175–205° C. (15μ). I.R. analysis showed this material to be primarily the desired product contaminated with a small amount of the primary amine.

Analysis.—Calcd, for $C_{24}H_{26}N_2$: N, 4.09. Found: N, 4.81.

The maleate salt of the above was prepared by mixing 7.25 g. of the base in 100 cc. of ether and 3.34 g. of maleic acid in 25 cc. of ethanol. The solid was collected yielding 12.0 g. of crude salt, M.P. 162–164° C. Recrystallization from acetonitrile left 6.6 g., M.P. 167–169° C.

*Analysis.*—Calcd, for $C_{28}H_{30}N_2O_4$: N, 3.16; N.E., 229. Found: N, 3.15; N.E., 195.

Example 5.—N-(3-aminopropyl)iminodibenzyl hydrochloride

A solution of 63.8 g. (0.15 mole) of the crude N-(3-dibenzylaminopropyl)iminodibenzyl in 120 cc. of ethanol containing 14.6 cc. of concentrated hydrochloric acid was treated with 3.0 g. of 10% palladium-on-charcoal and hydrogenated at 60 p.s.i. and 64° C. After 18 hours the reduction was stopped, the catalyst was separated by filtration, washed with ethanol and the solvent was removed from the filtrate under reduced pressure. The residue was suspended in boiling tetrahydrofuran and allowed to stand overnight. The solid was collected by filtration and washed with ether. The resulting tacky, impure material was dissolved in 200 cc. of boiling ethanol, filtered and allowed to crystallize in the cold. The solid was collected by filtration, washed with ether and dried yielding 8.5 g. of product, M.P. 256–257° C. A second recrystallization from ethanol afforded 6.7 g. of pure material, M.P. 258–260° C.

*Analysis.*—Calcd, for $C_{17}H_{21}ClN_2$: N, 9.69; Cl⁻, 12.27 Found: N, 9.54; Cl⁻, 12.54.

The following are exemplary pharmaceutical compositions that can be prepared containing the active compounds. The most active compound is N-(3-methylaminopropyl)iminodibenzyl.

Capsules: Per capsule, mg.
N-(3-methylaminopropyl)iminodibenzyl ___ 25.00
Lactose, U.S.P. _____ 200.00
Starch, U.S.P. _____ 18.00
                                        _____
                                        243.00

Mix the powders and fill by machine into No. 3 size hard gelatin capsules. (For hand-fill, the amount of lactose would have to be increased.)

Elixir:
N-(3-methylaminopropyl)
  iminodibenzyl _____ gm__ 5
Compound Orange Spirit, U.S.P. _____ ml__ 12
Syrup _____ ml__ 375
Alcohol.
Purified water, each, a sufficient quantity to make 1000 ml.

Each 5 cc. (teaspoonful) contains 25 mg. of N-(3-methylaminopropyl)iminodibenzyl.

Tablets: Per tablet, mg.
N-(3-methylaminopropyl)iminodibenzyl ____ 25.0
Amijel BO11 _____ 12.5
Lactose _____ 110.0
Corn starch _____ 35.5
Magnesium stearate _____ 2.0

Blend the Amijel BO11, N-(3-methylaminopropyl)iminodibenzyl and the lactose. Granulate with water. Dry at 150° F. Grind through a 16 mesh screen. Add the corn starch and magnesium stearate. Compress tablets, 5/16 inch diameter. (Amijel BO11 is a powdered starch preparation which has been pregelatinized, made by Corn Product Refining Co.).

What is claimed is:
1. The method of treating a depressed human to elevate his mood and induce muscle relaxation with central stimulation which comprises administering N-(3-methylaminopropyl)iminodibenzyl to said human in a daily amount from 5 to 500 mg. of said compound adequate to induce said effects without significant adverse side effects.
2. The method of claim 1 in which the said iminodibenzyl compound is administered in the form of a nontoxic acid addition salt.
3. A method in the management of depression which comprises the daily oral administration to a depressed human 5 to 500 mg. of the antidepressive therapeutic

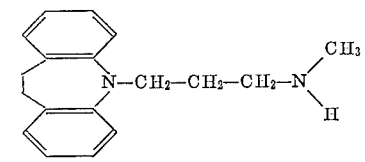

to produce an antidepressive effect.

4. A unit dosage pharmaceutical composition comprising 5 to 150 mg. of N-(3-methylaminopropyl)iminodibenzyl and a pharmaceutical carrier.
5. A pharmaceutical composition according to claim 4 in which the said iminodibenzyl compound is in the form of a nontoxic acid addition salt.
6. A unit dosage pharmaceutical composition comprising 5 to 150 mg. of N-(3-methylaminopropyl)iminodibenzyl, as the hydrochloride salt, and a pharmaceutical carrier.

References Cited

UNITED STATES PATENTS

| 2,554,736 | 5/1951  | Haefliger et al. | 260—239 |
| 2,813,857 | 11/1957 | Schindler et al. | 260—239 |
| 2,895,877 | 7/1959  | Marsh            | 167—65  |
| 2,742,397 | 4/1956  | Ott              | 167—65  |
| 2,785,160 | 3/1956  | Jacob.           |         |
| 2,830,987 | 4/1958  | Gailliat.        |         |

OTHER REFERENCES

Hollister: Annals of Internal Medicine, vol. 51, No 5, November 1959, pp. 1032–1048, especially, p. 1041.

FRANK CACCIAPAGLIA, JR., *Primary Examiner.*